(12) United States Patent
Nakase et al.

(10) Patent No.: US 12,296,254 B2
(45) Date of Patent: May 13, 2025

(54) MULTIDIRECTIONAL INPUT DEVICE, GAME MACHINE HANDLE AND GAME MACHINE

(71) Applicant: SHENZHEN ZESUM TECHNOLOGY CO., LTD., Shenzhen (CN)

(72) Inventors: Yusho Nakase, Shenzhen (CN); Sen Yang, Shenzhen (CN); Shiying Yang, Shenzhen (CN); Chaoxian Chen, Shenzhen (CN)

(73) Assignee: SHENZHEN ZESUM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/355,129

(22) Filed: Jul. 19, 2023

(65) Prior Publication Data

US 2024/0108975 A1   Apr. 4, 2024

(30) Foreign Application Priority Data

Sep. 29, 2022   (CN) .......................... 202211205661.9

(51) Int. Cl.
   *G05G 5/05*   (2006.01)
   *A63F 13/24*   (2014.01)
   (Continued)

(52) U.S. Cl.
   CPC .............. *A63F 13/24* (2014.09); *G01H 11/02* (2013.01); *G05G 5/05* (2013.01); *G05G 9/047* (2013.01);
   (Continued)

(58) Field of Classification Search
   CPC ...... G05G 5/05; G05G 9/047; G05G 2505/00; H01H 21/22; H01H 21/36
   See application file for complete search history.

(56) References Cited

U.S. PATENT DOCUMENTS 10,203,717 B2 *  2/2019  Olsson ................. G06F 3/0338
11,526,192 B2 * 12/2022  Nakase ................. G05G 9/047
   (Continued)

FOREIGN PATENT DOCUMENTS

CN    1763703 A    4/2006
CN  111158427 A    5/2020
   (Continued)

OTHER PUBLICATIONS

First Office Action issued in counterpart Chinese Patent Application No. 202211205661.9, dated Mar. 22, 2025.

*Primary Examiner* — Charles A Fox
*Assistant Examiner* — Gregory T Prather
(74) *Attorney, Agent, or Firm* — Westbridge IP LLC (57) ABSTRACT

Disclosed are a multidirectional input device, a game machine handle, and a game machine. The multidirectional input device includes a housing, an operation body, a pressing board, a resetting assembly, a circuit board, and a magnetic induction assembly. A space is formed in the housing, and an opening portion is formed at an upper portion of the space. The operation body includes an operation portion protruding upwards from the opening portion. The pressing board is shaped in a disc. The resetting assembly includes a spiral spring. One end of the spiral spring is configured to press a top of the pressing board onto a lower portion of the operation body, and another end of the spiral spring is configured to press a bottom of the space. The circuit board is provided in the space. The magnetic induction assembly includes a magnetic body and a magnetic sensor.

13 Claims, 7 Drawing Sheets

(51) Int. Cl.
*G01H 11/02* (2006.01)
*G05G 9/047* (2006.01)
*H01H 21/22* (2006.01)
*H01H 21/36* (2006.01)

(52) U.S. Cl.
CPC ............ *H01H 21/22* (2013.01); *H01H 21/36* (2013.01); *G05G 2505/00* (2013.01)

(56) References Cited

U.S. PATENT DOCUMENTS

| | | | |
|---|---|---|---|
| 11,561,568 B2* | 1/2023 | Nakase | G05G 9/047 |
| 2004/0252104 A1* | 12/2004 | Nakamura | G06F 3/011 |
| | | | 345/160 |
| 2020/0209908 A1* | 7/2020 | Arita | G06F 3/0312 |

FOREIGN PATENT DOCUMENTS

| | | | |
|---|---|---|---|
| CN | 115060150 A | 9/2022 | |
| CN | 218636595 U | 3/2023 | |

\* cited by examiner

MULTIDIRECTIONAL INPUT DEVICE, GAME MACHINE HANDLE AND GAME MACHINE

CROSS-REFERENCE TO RELATED APPLICATIONS

This application claims priority to Chinese Patent Application No. 202211205661.9, filed on Sep. 29, 2022, the entire contents of which are incorporated herein by reference.

TECHNICAL FIELD

The present application relates to the technical field of game machines, and in particular to a multidirectional input device, a game machine handle and a game machine.

BACKGROUND

The multidirectional input device generally includes a housing and an operation body rotatably placed in the housing. Users can operate the game machine through the operation body. However, the multidirectional input device in the related art mostly uses changes in the resistance value of the resistance body of the potentiometer to determine movement directions of the operation body. In this way, the resistance body of the potentiometer may have physical wear after long-term use, resulting in a reduction in the service life of the product.

SUMMARY

The main purpose of the present application is to provide a multidirectional input device, aiming to receive magnetic changes of the magnetic body without physical contact through the magnetic sensor when the operation body drives the magnetic body to move and obtain the shaking direction and the shaking range of the operating body, thereby avoiding physical wear after long-term use.

In order to solve the above objectives, the present application provides a multidirectional input device including a housing, an operation body, a pressing board, a resetting assembly, a circuit board, and a magnetic induction assembly. A space is formed in the housing, and an opening portion is formed at an upper portion of the space. The operation body is shaped in a cylinder, and the operation body includes an operation portion protruding upwards from the opening portion. The pressing board is shaped in a disc, and a hole is formed at a central portion of the pressing board. The resetting assembly includes a spiral spring. One end of the spiral spring is configured to press a top of the pressing board onto a lower portion of the operation body, and another end of the spiral spring is configured to press a bottom of the space to reset the operation body to a neutral position. The circuit board is provided in the space. The magnetic induction assembly includes a magnetic body and a magnetic sensor. The operation body shakes and drives the magnetic body to move along a random direction relative to the magnetic sensor, to allow the magnetic sensor to sense magnetic changes of the magnetic body to obtain a shaking direction and a shaking range of the operation body.

In an embodiment, the magnetic induction assembly further includes a sliding body, and along an axis of the operation portion, the sliding body is clamped at an installation hole provided at a lower end of the operation portion.

In an embodiment, the magnetic body is fixed at the sliding body.

In an embodiment, the magnetic induction assembly further includes an urging spiral spring stored in the installation hole. One end of the urging spiral spring is pressed at a top of the installation hole, and another end of the urging spiral spring is pressed at an upper portion of the sliding body.

In an embodiment, an installation space is formed at a lower portion of the sliding body, and the magnetic body is stored in the installation space. Along the axis of the operation portion, an inside wall of the installation space is provided with a clamping rib for fixing an outside wall of the magnetic body.

In an embodiment, the magnetic body is shaped in a disc.

In an embodiment, a central axis of the magnetic body is coincidence with a central axis of the operation body.

In an embodiment, the magnetic sensor includes a detection point located at an extension line of the central axis of the magnetic body.

In an embodiment, the magnetic induction assembly further includes a limiting support member provided in the space. The limiting support member is sleeved outside the magnetic sensor, and the sliding body is supported by an upper surface of the limiting support member.

In an embodiment, when the operation body shakes, a movement trajectory of the magnetic body is a plane circle or a sphere.

In an embodiment, the magnetic sensor is a three-dimensional magnetic sensor or a two-dimensional magnetic sensor.

In an embodiment, an upper hemisphere portion is provided at a lower portion of the operation portion along the axis of the operation portion. A diameter of the upper hemisphere portion is greater than a diameter of the operation portion, and a plane portion is provided at a lower portion of the upper hemisphere portion. A lower hemisphere portion is provided at the plane portion along the axis of the operation portion, and a diameter of the lower hemisphere portion is less than the diameter of the upper hemisphere portion.

In an embodiment, the multidirectional input device further includes a pressing bracket and a pressing switch, and both the pressing bracket and the pressing switch being provided in the space. An upper portion of the pressing bracket is provided with a spherical concave portion corresponding to the lower hemisphere portion, and a lower portion of the pressing bracket is provided with a pressing portion for pressing the pressing switch. The spherical concave portion of the pressing bracket is pressed through pressing the operation body, and the pressing switch is pressed through pressing the pressing portion of the pressing bracket to achieve an electrical operation.

In order to solve the above objectives, the present application further provides a game machine handle including the multidirectional input device as mentioned above.

In order to solve the above objectives, the present application further provides a game machine including the game machine handle as mentioned above.

In the technical solution of the present application, the user may control the operation body for shaking operations, then the operation body drives the magnetic body to move, and the magnetic change of the magnetic body is received by the magnetic sensor to obtain the rotation direction of the operation body. In this way, the moving direction of the operation body can be determined without physical contact. Compared to the existing method that the moving direction of the operation body is determined with physical contact, the multidirectional input device of the present application can avoid physical wear after long-term use, thereby ensuring the long service life of the product.

BRIEF DESCRIPTION OF THE DRAWINGS

To illustrate the technical solutions according to the embodiments of the present application or the related art more clearly, the accompanying drawings for describing the embodiments or the related art are introduced briefly in the following. Apparently, the accompanying drawings in the following description are only some embodiments of the present application. Those skilled in the art can derive other drawings from the structures of the accompanying drawings without creative efforts.

The realization of the objective, functional characteristics, and advantages of the present application are further described with reference to the accompanying drawings.

DETAILED DESCRIPTION OF THE EMBODIMENTS

The technical solutions of the embodiments of the present application will be described clearly in the following with reference to the accompanying drawings of the present application. It is obvious that the embodiments described are only some rather than all of the embodiments of the present application. Based on the embodiments of the present application, all other embodiments obtained by those skilled in the art without creative efforts shall fall within the scope of the present application.

It should be noted that all the directional indications (such as up, down, left, right, front, rear, etc.) in the embodiments of the present application are only used to explain the relative positional relationship, movement, or the like of the components in a certain posture (as shown in the drawings). If the specific posture changes, the directional indication will change accordingly.

Besides, the descriptions associated with, e.g., "first" and "second," in the present application are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

The present application provides a multidirectional input device 100.

Figure 1:
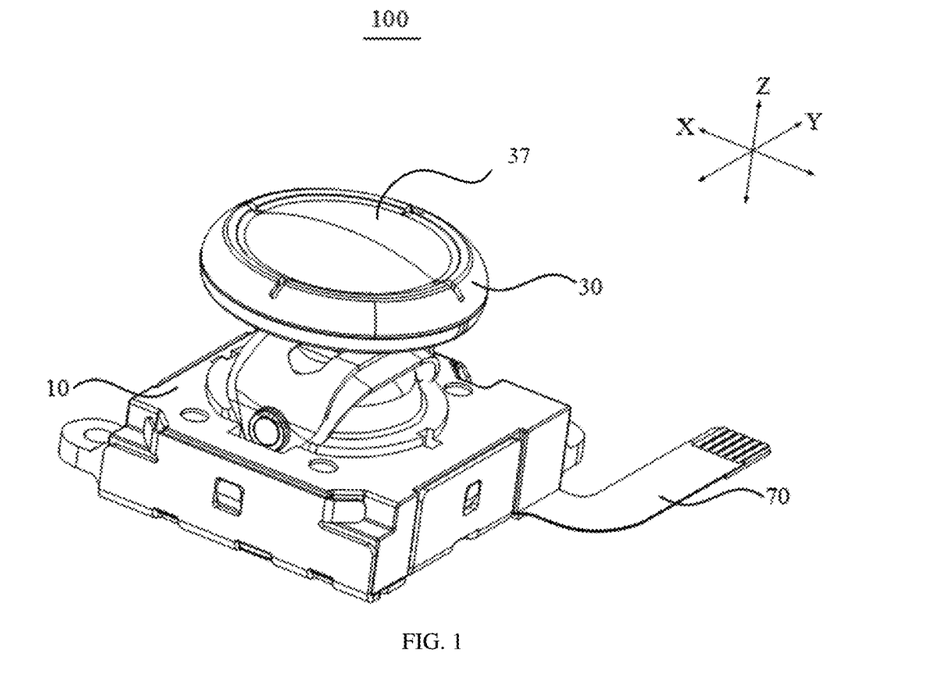
FIG. 1 is a schematic structural view of a multidirectional input device according to an embodiment of the present application.
Figure 2:
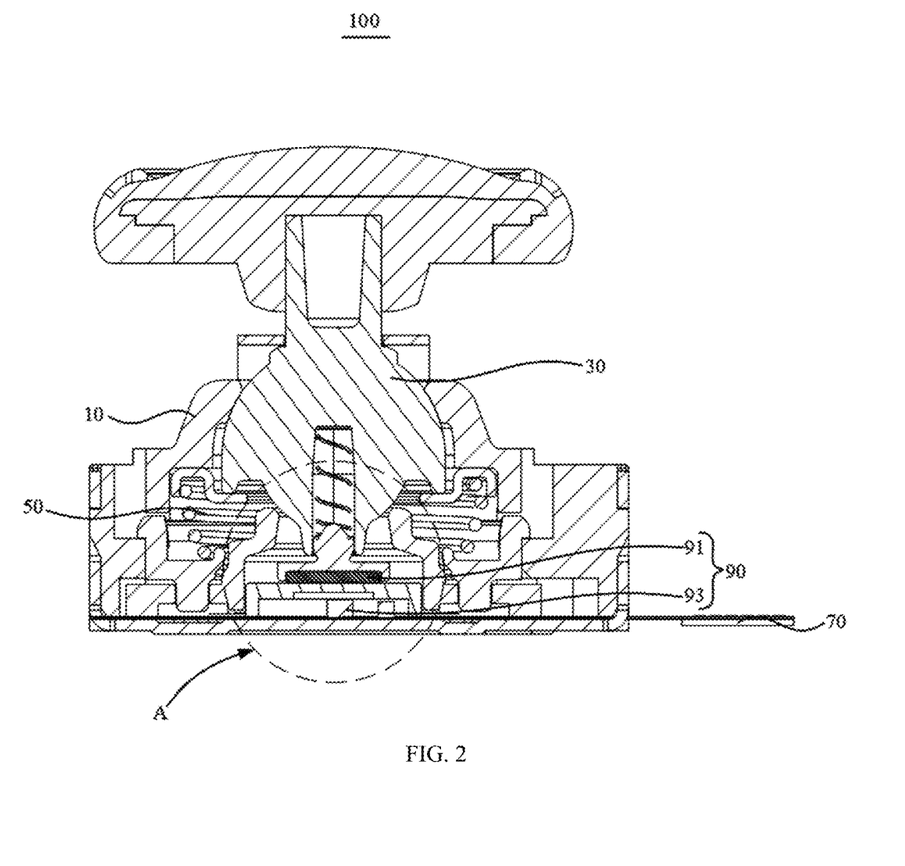
FIG. 2 is a sectional view of the multidirectional input device from a perspective in FIG. 1.
Figure 5:
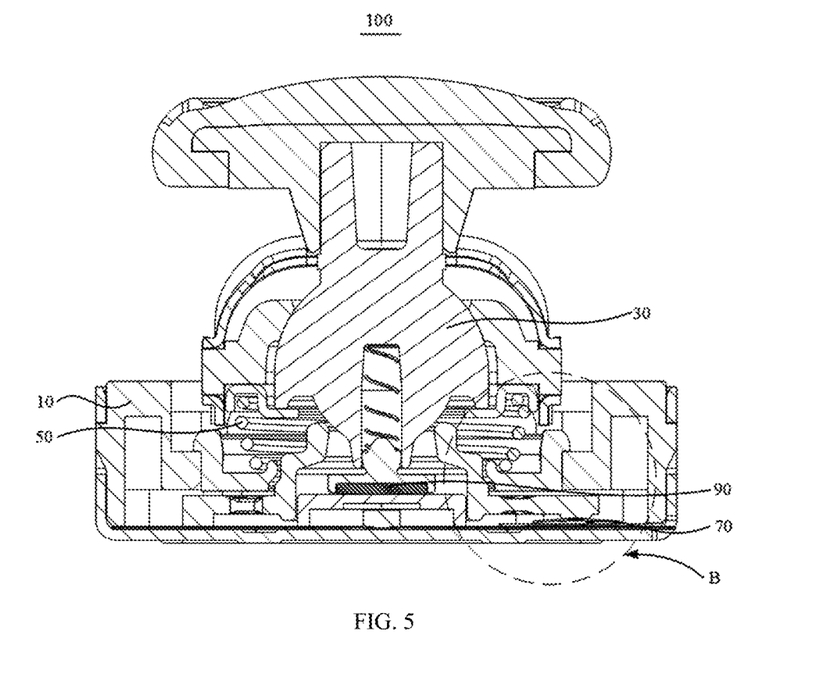
FIG. 5 is a sectional view of the multidirectional input device from another perspective in FIG. 1.

In an embodiment of the present application, as shown in FIG. 1, FIG. 2 and FIG. 5, the multidirectional input device 100 includes a housing 10, an operation body 30, a pressing board 51, a resetting assembly 50, a circuit board 70 and a magnetic induction assembly 90. A space is formed in the housing 10, and an opening portion is formed at an upper portion of the space. The operation body 30 is substantially shaped in a cylinder, and the operation body 30 includes an operation portion 37 protruding upwards from the opening portion. The pressing board 51 is shaped in a disc, and a hole is formed at a central portion of the pressing board 51. The resetting assembly 50 includes a spiral spring 53. One end of the spiral spring 53 is configured to press a top of the pressing board 51 onto a lower portion of the operation body 30, and another end of the spiral spring 53 is configured to press a bottom of the space to reset the operation body 30 to a neutral position. The circuit board 70 is provided in the space. The magnetic induction assembly 90 includes a magnetic body 91 and a magnetic sensor 93. The operation body 30 shakes and drives the magnetic body 91 to move along a random direction relative to the magnetic sensor 93, to allow the magnetic sensor 93 to sense magnetic changes of the magnetic body 91 to obtain a shaking direction and a shaking range of the operation body 30.

In this embodiment, it can be understood that the space can be an accommodation space. The operation portion 37 of the operation body 30 is used for the user to drive and perform corresponding shaking movements to allow the movement signal to input. For example, the operation portion 37 can be driven to shake forwards, backwards, leftwards, and rightwards, etc., to drive the magnetic body 91 to move forwards, backwards, leftwards, and rightwards. In addition, the operation portion 37 can move upwards or downwards, to drive the magnetic body 91 to move upwards or downwards. It should be noted that, the forward movement or the backward movement can be performed along the X-axis, and the leftward movement or the rightward movement can be performed along the Y-axis, and the upward movement or the downward movement can be performed along the Z-axis. The operation body 30 may include the operation portion 37, and the operation portion 37 passes through the opening portion and is exposed outside the housing 10. The projection of the operation portion 37 on the horizontal plane can be a circle, which is easy to rotate. In addition, when moving, the operation body 30 will abut against the pressing board 51. The abutted position between the operation body 30 and the pressing board 51 may be an annular surface of the pressing board 51, so that the annular resetting effect of the operation body 30 can be improved by setting the annular surface. The pressing board 51 may press the spiral spring 53 to make the spiral spring 53 elastically contract, and when the user loose the operation portion 37 of the operation body 30, the spiral spring 53 will apply a resetting force to the operation body 30 for automatically resetting the operation body 30.

It should be noted that the magnetic sensor 93 is electrically connected to the circuit board 70, and the magnetic body 91 can be a lodestone or a magnet. The magnetic sensor 93 is the Hall sensor. When the operation body 30 drives the magnetic body 91, the magnetic body 91 will cut magnetic induction lines, to allow the Hall sensor to receive magnetic changes generated by the magnetic body 91, so that the rotation direction of the operation body 30 can be obtained. Then the rotation direction will be transmitted to the circuit board 70 to achieve the output of the signal. The circuit board 70 can be the flexible printed circuit (FPC) 70, and the magnetic sensor 93 can be connected to the circuit board 70 by welding. In addition, the magnetic sensor 93 can also be set in parallel with the filter capacitor to improve the anti-interference ability of the magnetic sensor 93.

In the technical solution of the present application, the user may control the operation portion 37 for shaking operations, then the operation body 30 drives the magnetic body 91 to move, and the magnetic change of the magnetic body 91 is received by the magnetic sensor 93 to obtain the rotation direction of the operation body 30. In this way, the moving direction of the operation body 30 can be determined without physical contact. Compared to the existing method that the moving direction of the operation body 30 is determined with physical contact, the multidirectional input device 100 of the present application can avoid physical wear after long-term use, thereby ensuring the long service life of the product.

Figure 3:
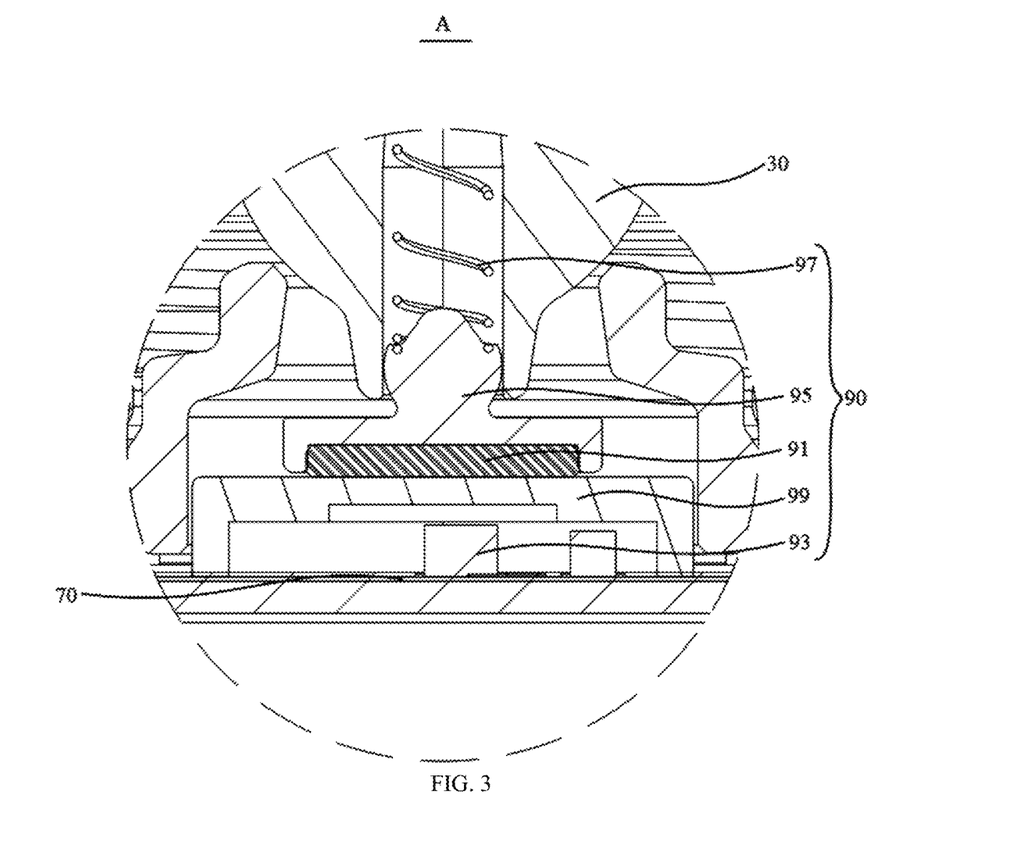
FIG. 3 is an enlarged view at A position in FIG. 2.
Figure 4:
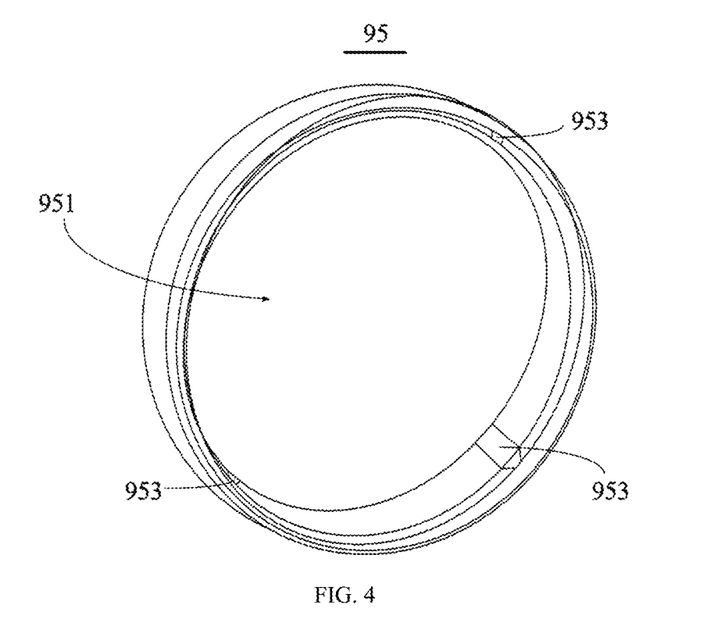
FIG. 4 is a schematic structural view of a sliding body of a magnetic induction assembly in FIG. 3.

In an embodiment of the present application, as shown in FIG. 3 and FIG. 4, the magnetic induction assembly 90 further includes a sliding body 95, and along an axis of the operation portion 37, the sliding body 95 is clamped at an installation hole provided at a lower end of the operation portion 37.

In this embodiment, the sliding body 95 is clamped at the installation hole provided at the lower end of the operation portion 37, that is, the operation portion 37 will clamp the sliding body 95, and the sliding body 95 will be driven to swing during the shaking process. To ensure that the X-axis signal and the Y-axis signal finally output by the multidirectional input device 100 can maintain the linearity and to ensure the accuracy of the output signal, it is necessary to prevent the magnetic body 91 from moving in the Y-axis. Therefore, the sliding body 95 is used for installing the magnetic body 91, which can reduce the movement of the magnetic body 91 in the Z-axis to ensure the linearity of the output signal.

In an embodiment of the present application, as shown in FIG. 3 and FIG. 4, the magnetic body 91 is fixed at the sliding body 95.

In this embodiment, the magnetic body 91 is fixed below the sliding body 95, which can ensure the firmness connection between the magnetic body 91 and the sliding body 95, so that the operation portion 37 can maintains stability when the sliding body 95 drives the magnetic body 91 to move.

In an embodiment of the present application, as shown in FIG. 2 and FIG. 3, the magnetic induction assembly 90 further includes an urging spiral spring 97 stored in the installation hole. One end of the urging spiral spring 97 is pressed at a top of the installation hole, and another end of the urging spiral spring 97 is pressed at an upper portion of the sliding body 95.

In this embodiment, by setting the urging spiral spring 97, the urging spiral spring 97 applies a downward pressure on the sliding body 95 in the Z-axis, which can ensure that the magnetic body 91 does not move in the Z-axis relative to the operation body 30 when the operation body 30 moves, and can further reduce a movement of the magnetic body 91 in the Z-axis to ensure the linearity of the output signal.

In an embodiment of the present application, as shown in FIG. 4, an installation space 951 is formed at the lower end of the sliding body 95, and the magnetic body 91 is stored in the installation space 951. Along the axis of the operation portion 37, an inside wall of the installation space 951 is provided with a clamping rib 953 for fixing an outside wall of the magnetic body 91.

In this embodiment, it can be understood that when the operation body 30 drives the sliding body 95 to move, if the stability of the connection between the magnetic body 91 and the installation space 951 of the sliding body 95 is poor, the magnetic body 91 is prone to disconnect and drop from the installation space 951. Therefore, the present application provides the clamping rib 953, and the clamping rib 953 is connected to the outside wall of the magnetic body 91, to improve the stability of the connection between the magnetic body 91 and the installation space 951.

Specifically, the number of clamping ribs 953 can be one, two, or three, and the like, which will not be limited herein, and the number of clamping ribs 953 can be determined by the actual connection requirements. In some embodiments, when the number of clamping ribs 953 is three, the three clamping ribs 953 are distributed at intervals along the circumference of the sliding body 95, to further increase the stability of the connection between the magnetic body 91 and the installation space 951.

In an embodiment of the present application, as shown in FIG. 3 to FIG. 4, the magnetic body 91 is shaped in a disc.

In this embodiment, the magnetic body 91 is shaped in a disc, which can improve the accuracy of the output signal of the magnetic body 91 in the X-axis and the Y-axis. It should be noted that, the shape of the installation space 951 is consistent with the shape of the cross section of the magnetic body 91. In other embodiments, the magnetic body 91 can also be a cylindrical structure, which can be selected according to the actual requirements.

In an embodiment of the present application, as shown in FIG. 2 to FIG. 3, a central axis of the magnetic body 91 is coincidence with a central axis of the operation body 30.

In this embodiment, the central axis of the magnetic body 91 is coincidence with the central axis of the operation body 30, to ensure the consistent rotation between the operation body 30 and the magnetic body 91 when the operation body 30 drives the magnetic body 91 to rotate, thereby increasing the accuracy of the magnetic sensor 93 obtaining the rotation direction of the operation body 30 when the operation body 30 is shaking.

In an embodiment of the present application, as shown in FIG. 3, the magnetic sensor 93 includes a detection point located at an extension line of the central axis of the magnetic body 91.

In this embodiment, the detection point of the magnetic sensor 93 is located at an extension line of the central axis of the magnetic body 91, to improve the accuracy of the magnetic sensor 93 receiving magnetic changes of the magnetic body 91. It should be noted that, when the magnetic sensor 93 is installed on the plane perpendicular to the Z-axis, the magnetic sensor 93 can ensure that the detection point is located on the extension line of the central axis of the magnetic body 91. In this case, if the detection point is not located at the center point of the magnetic sensor 93, the center point of the magnetic sensor 93 is slightly deviated from the extension line of the central axis of the magnetic body 91.

In an embodiment of the present application, as shown in FIG. 3, the magnetic induction assembly 90 further includes a limiting support member 99 provided in the space, and the limiting support member 99 is sleeved outside the magnetic sensor 93, and the sliding body 95 is supported by an upper surface of the limiting support member 99.

In this embodiment, to further reduce the movement of the sliding body 95 in the Z-axis and the movement of the magnetic body 91 in the Z-axis to ensure the linearity of the output signal, the present application provides the limiting support member 99 to abut against the magnetic body 91. In this way, not only the magnetic body 91 can be supported, but also the operation body 30 can be supported. Based on the limiting support member 99, a distance difference L will exist between the magnetic sensor 93 and the magnetic body 91 in the Z-axis. The range of the distance difference L can be 0.8 mm to 1.3 mm, and L can be 0.8 mm, 0.9 mm, 1.0 mm, 1.1 mm, 1.2 mm, or 1.3 mm. In some embodiments, L is 1.1 mm. In this case, the magnetic body 91 is not too far away from the magnetic sensor 93, thereby avoiding that the magnetic changes of the magnetic body 91 received by the magnetic sensor 93 are too weak. In addition, the magnetic body 91 is not too close to the magnetic sensor 93, thereby avoiding that the magnetic force is too strong to affect the receiving of the magnetic sensor 93. The value of L will not be limited herein.

In an embodiment of the present application, when the operation body 30 shakes, a movement trajectory of the magnetic body 91 is a plane circle or a sphere.

In this embodiment, when the operation body 30 shakes and drives the magnetic body 91 to move, there are generally two cases. One case is that the operation body 30 drives the magnetic body 91 to move along the X-axis and the Y-axis, in this case, the movement trajectory of the magnetic body 91 is a plane circle with reference to the plane perpendicular to the Z-axis. The other case is that the operation body 30 drives the magnetic body 91 to move along the X-axis, the Y-axis and the Z-axis, and in this case, the movement trajectory of the magnetic body 91 is a sphere.

In an embodiment of the present application, the magnetic sensor 93 is a three-dimensional magnetic sensor 93 or a two-dimensional magnetic sensor 93.

In this embodiment, when the operation body 30 drives the magnetic body 91 to move along the X-axis, the Y-axis, and the Z-axis, the magnetic sensor 93 needs to receive magnetic changes of the magnetic body 91 in three directions, so that the magnetic sensor 93 can be the three-dimensional magnetic sensor 93. When the operation body 30 drives the magnetic body 91 to move along the X-axis and the Y-axis, the magnetic sensor 93 only needs to receive magnetic changes of the magnetic body 91 in the two directions, so that the magnetic sensor 93 can be the two-dimensional magnetic sensor 93.

Figure 7:
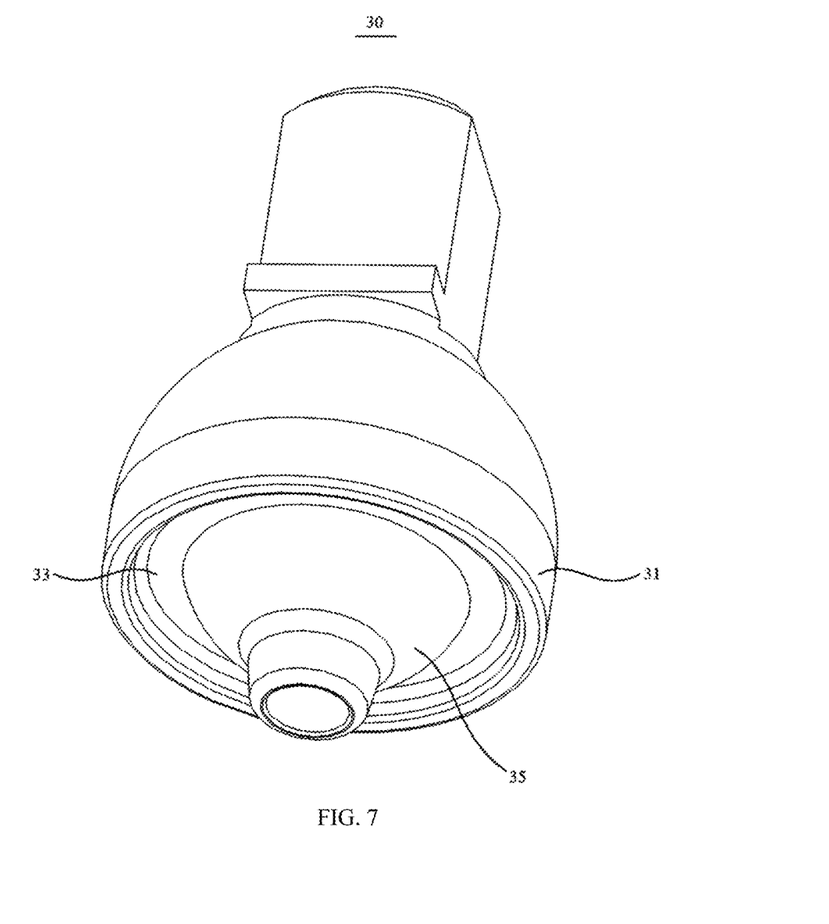
FIG. 7 is a schematic structural view of an operation body of the multidirectional input device in FIG. 2.

In an embodiment of the present application, an upper hemisphere portion 31 is provided at a lower portion of the operation portion 37 along the axis of the operation portion 37. A diameter of the upper hemisphere portion 31 is greater than a diameter of the operation portion 37, and a plane portion 33 is provided at a lower portion of the upper hemisphere portion 31. A lower hemisphere portion 35 is provided at the plane portion 33 along the axis of the operation portion 37, and a diameter of the lower hemisphere portion 35 is less than the diameter of the upper hemisphere portion 31.

In this embodiment, the upper hemisphere portion 31 can be used to fix and limit the operation portion 37. The lower hemisphere portion 35 is shaped in a hemisphere, and the upper surface of the lower hemisphere portion 35 is a plane connected to the plane portion 33. The center of the lower hemisphere portion 35 and the center of the upper hemisphere portion 31 are at the same point, and the lower surface of the lower hemisphere portion 35 is the spherical surface, which can be abutted against the pressing board 51.

Figure 6:
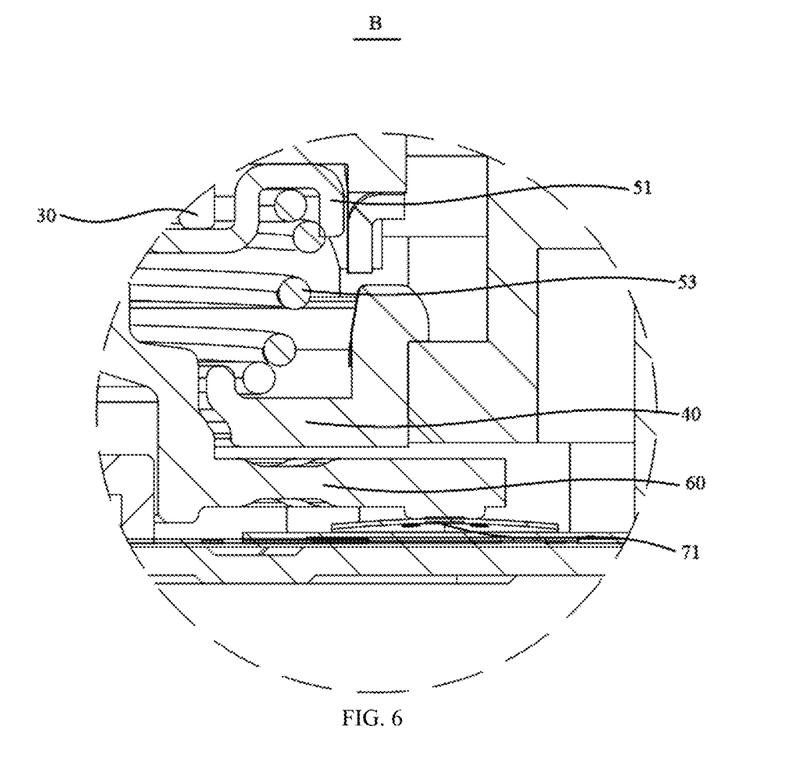
FIG. 6 is an enlarged view at B position in FIG. 5.

In an embodiment of the present application, as shown in FIG. 6, the multidirectional input device 100 further includes a pressing bracket 40 and a pressing switch 60. Both the pressing bracket 40 and the pressing switch 60 are provided in the space. An upper portion of the pressing bracket 40 is provided with a spherical concave portion corresponding to the lower hemisphere portion 35, and a lower portion of the pressing bracket 40 is provided with a pressing portion for pressing the pressing switch 60. The spherical concave portion of the pressing bracket 40 is pressed through pressing the operating body 30, and the pressing switch 60 is pressed through pressing the pressing portion of the pressing bracket 40 to achieve an electrical operation.

As the pressing bracket 40 and the pressing switch 60, the upper surface of the pressing bracket 40 is abutted against the lower portion of the operation body 30. When pressing the operation body 30, the pressing switch 60 is pressed through the pressing bracket 40, and the pressing switch 60 is triggered by the operation body 30 to abut against the circuit board 70 to achieve electrical operation.

In this embodiment, it can be understood that by setting the pressing bracket 40, the pressing switch 60 can be indirectly pressed through the pressing bracket 40 when the operation body 30 is pressed, so that the pressing switch 60 can abut against the metal shrapnel 71 of the circuit board 70 to realize the electrical connection. In this case, the pressing switch 60 may not be located directly below the operation body 30. In this way, not only the installation position requirements of the pressing switch 60 can be reduced and the installation convenience of the pressing switch 60 can be improved, but also the distribution of various components of the multidirectional input device 100 in the Z-axis can be more compact, thereby reducing the overall volume of the multidirectional input device 100, so that it can be managed and carried.

In addition, the present application further provides a game machine handle (not shown). The game machine handle includes the multidirectional input device 100 as mentioned above.

It should be noted that the detailed structure of the multidirectional input device 100 can be referred to embodiments of the multidirectional input device 100 as mentioned above, which will not be repeated herein. Since the above-mentioned multidirectional input device 100 is used in the game machine handle of the present application, embodiments of the multidirectional input device 100 shall include all the technical solutions of embodiments of the above-mentioned multidirectional input device 100, and the technical effects are exactly the same, which will not be repeated herein.

In addition, the present application further provides a game machine. The game machine includes the game machine handle as mentioned above.

It should be noted that the detailed structure of the game machine handle can be referred to embodiments of the game machine handle as mentioned above, which will not be repeated herein. Since the above-mentioned game machine handle is used in the game machine of the present application, embodiments of the game machine handle shall include all the technical solutions of embodiments of the above-mentioned game machine handle, and the technical effects are exactly the same, which will not be repeated herein.

The above-mentioned embodiments are only some embodiments of the present application, and are not intended to limit the scope of the present application. Any equivalent structure conversion made with reference to the description and the accompanying drawings of the present application, directly or indirectly applied in other related technical fields, should all fall in the scope of the present application.

What is claimed is:

1. A multidirectional input device, comprising:
a housing, wherein a space is formed in the housing, and an opening portion is formed at an upper portion of the space;
an operation body shaped in a cylinder, wherein the operation body comprises an operation portion protruding upwards from the opening portion;
a pressing board shaped in a disc, wherein a hole is formed at a central portion of the pressing board;
a resetting assembly comprising a spiral spring, wherein one end of the spiral spring is configured to press a top of the pressing board onto a lower portion of the operation body, and another end of the spiral spring is configured to press a bottom of an inner side of the housing to reset the operation body to a neutral position;
a circuit board provided in the space; and
a magnetic induction assembly comprising a magnetic body and a magnetic sensor, wherein the operation body shakes and drives the magnetic body to move along a direction relative to the magnetic sensor, to allow the magnetic sensor to sense magnetic changes of the magnetic body to obtain a shaking direction and a shaking range of the operation body;
wherein the magnetic induction assembly further comprises a sliding body, and along an axis of the operation portion, the sliding body is clamped at an installation hole provided at a lower end of the operation portion;
the magnetic induction assembly further comprises an urging spiral spring stored in the installation hole, one end of the urging spiral spring is pressed at a top of the installation hole, and another end of the urging spiral spring is pressed at an upper portion of the sliding body.

2. The multidirectional input device of claim 1, wherein the magnetic body is fixed at the sliding body.

3. The multidirectional input device of claim 1, wherein an installation space is formed at a lower portion of the sliding body, the magnetic body is stored in the installation space, and along the axis of the operation portion, an inside wall of the installation space is provided with a clamping rib for fixing an outside wall of the magnetic body.

4. The multidirectional input device of claim 1, wherein the magnetic body is shaped in a disc.

5. The multidirectional input device of claim 1, wherein a central axis of the magnetic body is coincidence with a central axis of the operation body.

6. The multidirectional input device of claim 1, wherein the magnetic sensor comprises a detection point located at an extension line of the central axis of the magnetic body.

7. The multidirectional input device of claim 1, wherein the magnetic induction assembly further comprises a limiting support member provided in the space, the limiting support member is sleeved outside the magnetic sensor, and the sliding body is supported by an upper surface of the limiting support member.

8. The multidirectional input device of claim 1, wherein when the operation body shakes, a movement range of the magnetic body is a plane circle or a sphere.

9. The multidirectional input device of claim 1, wherein the magnetic sensor is a three-dimensional magnetic sensor or a two-dimensional magnetic sensor.

10. The multidirectional input device of claim 1, wherein:
an upper hemisphere portion is provided at a lower portion of the operation portion along the axis of the operation portion, and a plane portion is provided at a lower portion of the upper hemisphere portion; and
a lower hemisphere portion is provided at the plane portion along the axis of the operation portion, and a diameter of the lower hemisphere portion is less than a diameter of the upper hemisphere portion.

11. The multidirectional input device of claim 10, further comprising a pressing bracket and a pressing switch, both the pressing bracket and the pressing switch being provided in the space, wherein:
an upper portion of the pressing bracket is provided with a spherical concave portion corresponding to the lower hemisphere portion, and a lower portion of the pressing bracket is provided with a pressing portion for pressing the pressing switch; and
the spherical concave portion of the pressing bracket is pressed through pressing the operation body, and the pressing switch is pressed through pressing the pressing portion of the pressing bracket to achieve an electrical operation.

12. A game machine handle, comprising the multidirectional input device of claim 1.

13. A game machine, comprising the game machine handle of claim 12.

* * * * *